United States Patent [19]

Tajima et al.

[11] Patent Number: 5,314,946
[45] Date of Patent: May 24, 1994

[54] POLYOLEFIN RESIN COMPOSITIONS, METHODS OF MAKING SUCH COMPOSITIONS, AND MOLDED ARTICLES FORMED THEREOF

[75] Inventors: Yoshihisa Tajima; Keiichi Miyawaki, both of Shizuoka, Japan

[73] Assignee: Polyplastics Co., Ltd., Osaka, Japan

[21] Appl. No.: 796,724

[22] Filed: Nov. 20, 1991

[30] Foreign Application Priority Data

Nov. 21, 1990 [JP] Japan ................... 2-320053

[51] Int. Cl.$^5$ .............................. C08K 7/28
[52] U.S. Cl. ........................... 524/513; 525/903
[58] Field of Search ............... 524/513; 525/903

[56] References Cited

U.S. PATENT DOCUMENTS

| | | | |
|---|---|---|---|
| 4,386,174 | 5/1983 | Cogswell et al. | 524/27 |
| 4,434,262 | 2/1984 | Buckley et al. | 524/605 |
| 4,699,935 | 10/1987 | Sano | 523/206 |
| 4,728,698 | 3/1988 | Isayev et al. | 525/439 |

FOREIGN PATENT DOCUMENTS

| | | |
|---|---|---|
| 0202430 | 11/1986 | European Pat. Off. |
| 0271327 | 6/1988 | European Pat. Off. |
| 0426482A3 | 5/1991 | European Pat. Off. |
| 2337747 | 1/1976 | France |

*Primary Examiner*—Paul R. Michl
*Assistant Examiner*—Edward Cain
*Attorney, Agent, or Firm*—Nixon & Vanderhye

[57] ABSTRACT

Polyolefin molding compositions and molded articles thereof exhibit exceptional mechanical strength, dimensional accuracy and heat deformation characteristics and are provided by melt-blending a polyolefin base resin, a liquid-crystal polyester resin, and a filler material. The liquid-crystal polyester is one which exhibits optical anisotropic characteristics in the melt-phase and preferably has a melt-viscosity of 20000 to 50 Poise as determined at a temperature of 310° C. and a shear rate of 1200 sec$^{-1}$. The liquid-crystal polyester resin forms a three-dimensional network structure throughout the polyolefin base resin and envelops substantially all of the filler material therewithin. As a result, the molded articles of the polyolefin compositions can be employed in end-use applications which require improved mechanical strength, dimensional accuracy and/or heat deformation characteristics.

6 Claims, No Drawings

POLYOLEFIN RESIN COMPOSITIONS, METHODS OF MAKING SUCH COMPOSITIONS, AND MOLDED ARTICLES FORMED THEREOF

FIELD OF INVENTION

The present invention generally relates to novel polyolefin resin compositions, methods of making such compositions and to molded articles formed thereof. More specifically, the polyolefin resin compositions of this invention are especially characterized by a melt-blend of a polyolefin base resin, a melt-processable liquid-crystal polyester (to be defined below), and a filler. The compositions of this invention exhibit exceptional mechanical properties, particularly enhanced heat deformation temperatures and improved dimensional accuracies.

BACKGROUND AND SUMMARY OF THE INVENTION

Polyolefin resins, such as homopolymers and copolymers of polyalkylenes (e.g., polyethylene, inexpensive as compared to other engineering resins, and are employed in a number of end use applications in fairly large quantities. However, polyolefin resins are generally quite flexible and have somewhat limited mechanical properties. For example, polyolefin resins typically have a low heat deformation temperature which causes the resin to shrink or deform during molding operations and/or during exposure to high temperature environments. As such, polyolefin resins are not typically used to produce components for electronic or electrical appliances, automobile parts and parts of other apparatus.

Reinforcement agents and fillers, such as glass fibers, have been blended with polyolefin resins as a means to improve physical properties so as to off-set the disadvantages noted above. However, even though some noticeable property improvements have been obtained, the inherent physical properties of polyolefin resins still make them unsuitable for several end use applications. That is, even though the mechanical properties and/or heat deformation temperatures of polyolefin resins are improved somewhat by the incorporation of reinforcement agents, further significant property improvements are still desired.

In this connection, a conventional fiber-reinforced polyolefin resin typically exhibits enhanced anisotropy during mold shrinkage which results in deformed molded articles. As a consequence, it is difficult to produce a molded article from such conventional fiber-reinforced polyolefin compositions which exhibits and-/or retains precise dimensional accuracy and shape. Thus, conventional fiber-reinforced polyolefin resins are unsuitable to form relatively large-sized molded articles or molded articles which require close dimensional and/or shape tolerances, even though such resins remain attractive for such purposes due to their relative low cost.

It has also been proposed to incorporate other thermoplastic resins as additives in polyolefin base resins so as to improve the mechanical properties of polyolefin resins. However, since polyolefin resins are generally incompatible with other thermoplastic resins, particularly with other thermoplastic engineering resins that could impart the desired property enhancements, the added thermoplastic resin is typically inhomogeneously dispersed within the polyolefin base resin (e.g., in bulk or particle forms). Thus, the incorporation of other thermoplastic engineering resins in polyolefin base resins has generally not been successful since the resin incompatibility results in surface peeling as well as insufficient physical and/or mechanical properties. As a result, these conventional resins are not a practical solution to imparting property enhancements to polyolefin resins.

A need therefore exists for polyolefin resins that have enhanced mechanical and/or deformation resistance properties so that the end use applications for polyolefins can be expanded by providing relatively lower cost molded components and parts, as compared to those conventional engineering resins now being used to form molded components for such end use applications. It is towards fulfilling such a need that the present invention is directed.

Broadly, the present invention is directed to filled (i.e., having a filler material) polyolefin resin compositions which additionally contain a liquid crystal polyester resin. The resin compositions of this invention are homogenous melt-blends and exhibit remarkable mechanical property improvements, particularly in terms of dimensional stability (e.g., resistance to heat and/or mold shrinkage).

More specifically, the compositions of the present invention are prepared by melt-blending meaningful amounts of a filler material and a specific liquid-crystal polyester resin (i.e., a polyester having an anisotropic melt-phase) with a polyolefin base so that the resulting compositions exhibit improved physical properties, particularly heat and deformation resistance properties. Thus, the filler and the liquid-crystal polyester synergistically cooperate to impart exceptional dimensional accuracy to molded articles formed of the polyolefin compositions of this invention.

Further aspects and advantages of this invention will become more clear after careful consideration is given to the following detailed description of the preferred exemplary embodiments which follow.

DETAILED DESCRIPTION OF THE PREFERRED EXEMPLARY EMBODIMENTS

The preferred compositions of the present invention are produced by melt-blending with a polyolefin base resin, a deformation-resistant effective amount of an additive "system" which includes a melt-processable liquid-crystal polyester resin (i.e., a polyester resin which forms an anisotropic melt-phase), and a filler material The preferred compositions will include (A) between about 50 to 99 parts by weight of the polyolefin base resin, (B) between about 1 to 50 parts by weight of the melt-processable liquid-crystal polyester resin, and (C) between 1 to 300 parts by weight of the filler material.

The polyolefin base resin that is used in the compositions of the present invention may be a homopolymer or copolymer derived from an olefin monomer, such as ethylene, propylene or the like. Particular examples of the polyolefin base resin include polymers (including homopolymers and copolymers) of ethylene and $\alpha$-olefins, such as high, medium and low density polyethylenes, propylene, polybutene-1, poly-3-methylbutene-1 and poly-4-methylpentene-1; copolymers comprised of at least two monomers selected from among ethylene and $\alpha$-olefins; and copolymers comprised of one or more monomers selected from among ethylene and $\alpha$-olefins and a comonomer selected from among vinyl esters such as vinylacetate; acrylic or methacrylic acid derivatives (such as methyl acrylate, methyl methacrylate and dimethylaminoethylacrylamide); glycidyl esters of α,β-unsaturated acids (such as glycidyl acrylate and glycidyl methacrylate); and dienes such as butadiene is isoprene The liquid-crystal polyester resin that is a necessary component of the compositions according to the present invention is a polyester which is, and of itself, melt-processable and which exhibits regularly arranged parallel molecular chains when in a molten state. The molecule of such a liquid-crystal polyester is generally slender and flat, exhibits a relatively high stiffness along its major axis thereof and contains chain-lengthening bonds which are present either coaxially or in parallel.

As used herein and in the accompanying claims, the term "liquid-crystal polyester resin" is meant to include any polyester resin which exhibits optical anisotropic characteristics in the melt phase.

The presence of an anisotropic melt-phase in the liquid-crystal polyester resin can be ascertained by conventional test procedures using polarized light and crossed nicols. More precisely, a molten sample may be placed upon a Leitz hot stage and observed in a nitrogen atmosphere using a Leitz polarization microscope (40×magnification). When a liquid-crystal polyester which is used in the compositions of the present invention is tested according to this method between crossed nicols, polarized light should be transmitted through the nicols even when the polyester is in a static molten state. That is, "liquid-crystal polyester resins" within the scope of the present invention will exhibit optical anisotropy in the melt-phase.

Although the liquid-crystal polyester resins to be used in the compositions of the present invention are generally unfit for solution molding or processing because they are substantially insoluble in typical solvents, they can be easily molded or processed using conventional melt-processing techniques.

The preferred liquid-crystal polyester resins from a chemical structure point of view are aromatic polyesters or aromatic polyesteramides, although polyesters partially containing aromatic polyester and aromatic polyesteramide units in the same molecular chain may be used, provided that the requisite liquid-crystallinity is present. Particularly preferred are liquid-crystal aromatic polyesters and liquid-crystal aromatic polyesteramides each containing units derived from at least one constituent monomer selected from the group consisting of aromatic hydroxy carboxylic acids, aromatic hydroxylamines and aromatic diamines.

Other specific examples of preferred liquid crystal polyesters include:

(1) polyesters which are mainly comprised of units derived from one or more constituent monomers selected from among aromatic hydroxy carboxylic acids and derivatives thereof;

(2) polyesters which are mainly comprised of units derived from comonomers selected from among:
  (a) one or more of aromatic hydroxy carboxylic acids and derivatives thereof,
  (b) one or more of aromatic dicarboxylic acids, alicyclic, dicarboxylic acids and derivatives thereof, and
  (c) one or more of aromatic diols, alicyclic diols, aliphatic diols and derivatives thereof;

(3) polyesteramides which are mainly comprised of units derived from comonomers selected from among
  (a) one or more of aromatic hydroxy carboxylic acids and derivatives thereof,
  (b) one or more of aromatic hydroxy amines, aromatic diamines and derivatives thereof, and
  (c) one or more of aromatic dicarboxylic acids, alicyclic dicarboxylic acids and derivatives thereof; and (4) polyesteramides which are mainly comprised of units derived from comonomers selected from among
  (a) one or more of aromatic hydroxy carboxylic acids and derivatives thereof,
  (b) one or more of aromatic hydroxy amines, aromatic diamines and derivatives thereof,
  (c) one or more of aromatic dicarboxylic acids, alicyclic dicarboxylic acids and derivatives thereof, and
  (d) one or more of aromatic diols, alicyclic diols, aliphatic diols and derivatives thereof.

Furthermore, a part or the entirety of the hydroxyl groups of the hydroxyl compounds described above may be replaced by thiol (—SH) groups.

Particularly preferred examples of the constituent monomer of the liquid-crystal polyester that is used in the compositions of the present invention include p-substituted benzene derivatives such as p-hydroxybenzoic acid, terephthalic acid, hydroquinone, p-aminophenyl and p-phenylenediamine and ring-substituted derivatives thereof (wherein the substituent is selected from among chlorine, bromine, methyl, phenyl and 1-phenylethyl); m-substituted benzene derivatives such as isophthalic acid and resorcinol; naphthalene derivatives such as 2,6-naphthalenedicarboxylic acid, 2,6-dihydroxynaphthalene, 1,4-dihydrocynaphthalene and 6-hydroxy-2-naphthoic acid; biphenyl compounds such as 4,4'-diphenyldicarboxylic acid and 4,4'-dihydroxybiphenyl; and bisphenol compounds represented by the following general formulas (I), (II) and (III):

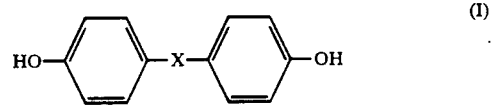

(I)

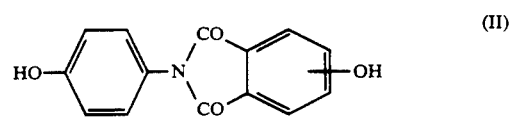

(II)

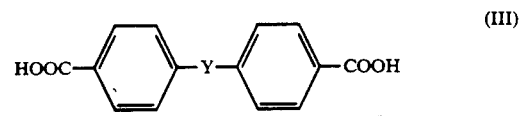

(III)

wherein X represent a group selected from among alkylene groups having 1 to 4 carbon atoms, alkylidene groups and —O—, —SO—, —SO$_2$—, —S— and —CO—groups; and Y represents a group selected from among —(CH$_2$)$_n$—(wherein n is 1 to 4), and —O(CH$_2$.)$_n$O—(wherein n is 1 to 4).

The liquid-crystal polyester to be used in the present invention may partially contain in the same molecule a non-liquid crystal polyalkylenes terephthalate (i.e. does not form an anisotropic melt-phase) having 2 to 4 carbon atoms in addition to the constitutent segments described above.

Among the liquid-crystal polyesters described above, polyesters which contain units derived from one or more monomers selected from p-substituted benzene derivatives, naphthalene derivatives and biphenyl compounds are especially preferred. Furthermore, among the p-substituted benzene derivatives listed above, p-hydroxybenzoic acid, methylhydroquinone and 1-phenylethylhydroquinone are particularly preferable.

The liquid-crystal polyester resins which are desirably used in the compositions of the present invention are polyesters which exhibit liquid crystallinity at 350° C. or below and have a melt-viscosity of 50000 P or below, preferably 20000 to 50 P, still preferably 10000 to 100 P as determined at 310° C. and a shear rate of 1200 sec$^{-1}$. A liquid-crystal polyester having a melt-viscosity which is too high or low may be difficult to disperse homogeneously throughout the polyolefin base resin. As a result, not only are molding difficulties to be expected, but less improvements in the mechanical and heat/deformation resistance properties may be achieved.

The polyolefin resin compositions of the present invention may optionally contain minor amounts of other thermoplastic resins provided that the beneficial property enhancements achieved by the necessary components are not substantially deleteriously affected.

Examples of optional thermoplastic resins that may be incorporated into the compositions of this invention include non-liquid-crystal aromatic polyesters prepared from either aromatic dicarboxylic acid and diol or hydroxy carboxylic acid, such as polyethylene terephthalate and polybutylene terephthalate; polyacetals (homopolymer and copolymers), polystyrene, polyvinyl chloride, polyamide, polycarbonate, ABS, polyarylene oxide and polyarylene sulfide. These thermoplastic resins may be used as a mixture of two or more of the same.

According to the present invention, a fibrous, powdery or flaky filler is also necessarily included in the compositions of this invention.

Specific examples of fibrous fillers include inorganic fibrous materials such as glass fibers, asbestos fibers, carbon fibers, silica fibers, silica/alumina fibers, zirconia fibers, boron nitride fibers, silicon nitride fibers, boron fibers and potassium titanate fibers, and fibrous materials of metal such as stainless steel, aluminum, titanium, copper or brass fibers. High-melting organic fibrous materials which do not melt during melt-blending of the composition, for example, polyamides, fluororesins and acrylic resins may also be used.

Examples of powdery fillers include carbon black, silicates such as silica, quartz powder, glass bead, glass powder, calcium silicate, aluminum silicate, kaolin, talc, clay, diatomaceous earth and wollastonite, metal oxides such as iron oxide, titanium oxide and alumina; carbonates such as calcium carbonate and magnesium carbonate; sulfates such as calcium sulfate and barium sulfate; silicon carbide, silicon nitride, boron nitride and various powdered metals.

Examples of flaky fillers include mica, glass flakes and various metal foils.

The filler materials useable in the present invention may optionally be treated prior to use with a conventional surface treatment, using, for example, silanes, epoxies, titanates or polyamides.

A particular representative example of the filler material is glass fiber preferably having a mean diameter of 5 to 30 μm and a mean length of at least 50 μm, still preferably at least 100 μm. The simultaneous use of such a glass fiber with other powdery and/or flaky inorganic fillers is also particularly preferred.

According to the present invention, the weight ratio of the polyolefin base resin to the liquid-crystal polyester is between 99:1 and 50:50, and preferably between 98:2 and 60:40. Furthermore, the filler is present in an amount between about 1 to 300 parts by weight, preferably between about 5 to 200 parts by weight per 100 parts by weight of the composition.

The compositions of the present invention may further contain other additives conventionally incorporated in engineering resins, such as antioxidants, heat stabilizers, lubricants, nucleating agents, ultraviolet absorbers, colorants, mold release agents so as to obtain other desired properties. These additives may be added to the resin composition simultaneously during melt-blending of the necessary components (which will be described below) or separately therefrom.

Although the compositions of the present invention can be prepared by a number of known techniques, the necessary components—i.e., the polyolefin base resin liquid-crystal polyester resin, and filler material—must be blended together, and melt-kneaded for at least 30 seconds. More particularly, these necessary components are preliminarily mixed together with a mixing machine (such as tumbler or Henschel mixer), fed into a single- or twin-screw extruder and melt-kneaded in the extruder to give a pelletized composition. Melt-kneading is accomplished at a temperature at least 5° to 100° C. greater than the higher melting point resin component. However, if melt-kneading is accomplished at too high a temperature, undesirable decomposition or abnormal reactions may occur. The components are melt-kneaded for a time between 30 seconds to 15 minutes, preferably between 1 to 10 minutes.

Conventional compositions containing a polyolefin resin and another thermoplastic resin generally exhibit a so-called sea-island morphology wherein the added resin is present as particulate islands in a sea of polyolefin resin. Such a state is typically present even when the added resin is relatively compatible with the polyolefin resin. On the other hand, the compositions of the present invention exhibit a homogeneous dispersion of the added components, wherein at least a part, and generally most, of the liquid-crystal polyester component interlinks with the filler material and penetrates into the polyolefin base resin component in a three-dimensional branched or networked state to form an intertwined structure. Particularly, electron-microscopic examination reveals that the compositions prepared under the preferred conditions according to the present invention have a structure characterized in that the liquid-crystal polyester component envelops nearly all of the filler material, and that most of the liquid-crystal polyester component forms a continuous phase in which the filler material is present in an interlinked state—that is, a continuous phase which is dispersed throughout the polyolefin base resin as a three-dimensional network.

The internal resin structure described above can easily be attained particularly when the filler material has a surface tension of at least 40 dyn/cm at the melt-kneading temperature. The structure which is present in the compositions of this invention is effective in improving the compositions' mechanical characteristics and heat deformation temperature. Particularly, when a fibrous filler material is used, the structure effectively serves to depress the anisotropic arrangement of the filler so as to improve the dimensional accuracy and deformation resistance characteristics of the composition. Although most of the fillers described above each exhibit a surface tension satisfying the above requirement, it has been found that a filler which does satisfy the surface tension threshold can nonetheless attain the effects of the present invention by treating the surface of such fillers so as to enhance the surface tension characteristics.

The invention will be further described below in connection with the following non-limiting Examples.

EXAMPLES

Examples 1 to 4 and Comparative Examples 1 to 3

A polypropylene (PP) resin (a product of Mitsui Petrochemical Industries, Ltd., 400F) was used as component (A), a liquid-crystal polyester resin (B-1) (which will be described below) was used as component (B) and glass fibers were used as component (C). These components were blended together at a ratio specified in Table 1 below and melt-kneaded in a twin-screw extruder having a diameter of 30 mm at a temperature of 310° C. to obtain pellets. The pellets were then molded into a tensile test piece with an injection molding machine (mfd. by Nissei Jushi Kogyo K.K.) at a barrel temperature of 310° C. and a mold temperature of 60° C. The test piece was examined for the dispersion of the components, shrinkage factor, heat deformation temperature (HDT) and tensile strength and elongation. The results are given in Table 1.

The dispersion of the components was determined by cutting the test piece into a test segment (about $10 \times 10 \times 3$ mm), treating it in a xylene solution at 130° C. under reflux for 12 hours to dissolve the polypropylene resin as the matrix in the xylene solution, and observing the resulting test piece with the naked eye or by means of an electron microscope. According to this test method, the test piece retains its shape when the liquid-crystal polyester and the glass fibers are homogeneously dispersed throughout the polyolefin resin so as to form a network structure, while the test piece loses its shape when the components are dispersed homogeneously (i.e. are present in a particulate state). The dispersion was further quantitatively evaluated by passing the residue remaining after the extraction with xylene through a sieve having an opening diameter of 4 mm. The weight ratio of the components (B) and (C) dispersed in a network state was then calculated using the weight of the cake remaining on the sieve. That is, the weight of the cake being near the total weight of the liquid-crystal polyester and the glass fibers that were used was indicative of the formation of an interpenetrating network structure.

The shrinkage factor was determined by accurately measuring the dimension in a predetermined direction of the test piece and is expressed by the percent difference from the corresponding mold dimension.

The heat deformation temperature (HDT) was determined according to ASTM D-648 (18.6 kg/cm$^2$), while the tensile strength and elongation were determined according to ASTM D-638.

Examples 5 to 7

The same procedure as that of the Example 2 was repeated except that the amount of the glass fibers used was varied. The results are given in Table 2.

Example 8 and Comparative Examples 4 to 6

The same procedure as that of each of the Example 2 and Comparative Examples 1 to 3 was repeated except that the component (A) was replaced by polyethylene (PE) (a product of Mitsui Petrochemical Industries, Ltd., "Hizex"). The results are given in Table 3.

Examples 9 and 10 and Comparative Examples 7 and 8

The same procedure as that of each of Example 2 and Comparative Example 2 was repeated except that the component (B) was replaced by B-2 or B-3 (see the notes which will be given below). The results are given in Table 4.

Example 11 and Comparative Example 9

The same procedure as that of each of the Example 2 and Comparative Example 3 was repeated except that the glass fiber used as the component (C) was replaced by talc. The results are given in Table 5.

Notes: The structures and viscosities of the liquid-crystal polyesters used in th above Examples as the component (B) are as follows:

B-1:

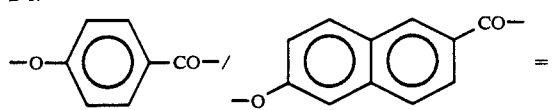

about 70/30 (molar ratio) viscosity: about 600 P (as determined at 310° C. and a shear rate of 1200 sec$^{-1}$)

B-2:

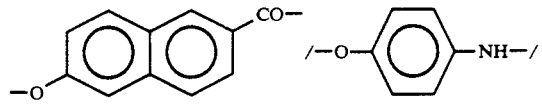

viscosity: about 5000 P (as determined at 310° C. and a shear rate of 1200 sec$^{-1}$)

B-3:

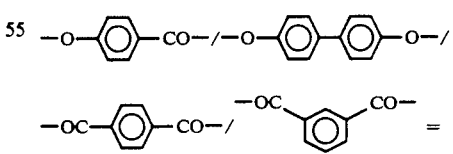

70/15/10/5 (molar rate) viscosity: about 1500 P (as determined at 310° C. and a shear rate of 1200 sec$^{-1}$)

TABLE 1

|  |  |  | Example |  |  |  | Comparative Example |  |  |
|---|---|---|---|---|---|---|---|---|---|
|  |  |  | 1 | 2 | 3 | 4 | 1 | 2 | 3 |
| Composition | (A) PP | pts. by wt. | 60 | 75 | 94 | 97 | 100 | 75 | 100 |

TABLE 1-continued

|  |  |  | Example | | | | Comparative Example | | |
| --- | --- | --- | --- | --- | --- | --- | --- | --- | --- |
|  |  |  | 1 | 2 | 3 | 4 | 1 | 2 | 3 |
|  | (B) B-1 (note) | pts. by wt. | 40 | 25 | 6 | 3 | — | 25 | — |
|  | (C) glass fiber | pts. by wt. | 25 | 25 | 25 | 25 | — | — | 25 |
| Dispersion | shape after dissolution of A | — | retained | retained | retained | retained | not retained | not retained | not retained |
|  | amount of cake on sieve after dissolution | pts. by wt. (% based on B + C) | 56 (86) | 47 (94) | 15 (48) | 10 (36) | 0 (—) | 0 (0) | 0 (0) |
| Physical properties | tensile strength | kg/cm$^2$ | 784 | 605 | 548 | 537 | 350 | 371 | 396 |
|  | tensile elongation | % | 2.0 | 2.2 | 2.7 | 3.0 | >300 | 7.2 | 5.6 |
|  | shrinkage factor | % | 0.13 | 0.14 | 0.23 | 0.25 | 2.0 | 0.63 | 0.34 |
|  | HDT | °C. | 145 | 133 | 130 | 130 | 68 | 88 | 102 |

TABLE 2

|  |  |  | Example | | | Comparative Example | |
| --- | --- | --- | --- | --- | --- | --- | --- |
|  |  |  | 5 | 6 | 7 | 1 | 2 |
| Composition | (A) PP | pts. by wt. | 75 | 75 | 75 | 100 | 75 |
|  | (B) B-1 (note) | pts. by wt. | 25 | 25 | 25 | — | 25 |
|  | (C) glass fiber | pts. by wt. | 10 | 50 | 100 | — | — |
| Dispersion | shape after dissolution of A | — | retained | retained | retained | unretained | unretained |
|  | amount of cake on sieve after dissolution | pts. by wt. (% based on B + C) | 31 (89) | 70 (93) | 122 (98) | 0 (—) | 0 (0) |
| Physical properties | tensile strength | kg/cm$^2$ | 496 | 874 | 1751 | 350 | 371 |
|  | tensile elongation | % | 3.2 | 1.9 | 1.7 | >300 | 7.2 |
|  | shrinkage factor | % | 0.22 | 0.13 | 0.11 | 2.0 | 0.63 |
|  | HDT | °C. | 115 | 152 | 160 | 68 | 88 |

TABLE 3

|  |  |  | Example | Comparative Example | | |
| --- | --- | --- | --- | --- | --- | --- |
|  |  |  | 8 | 4 | 5 | 6 |
| Composition | (A) PP | pts. by wt. | 75 | 100 | 75 | 100 |
|  | (B) B-1 (note) | pts. by wt. | 25 | — | 25 | — |
|  | (C) glass fiber | pts. by wt. | 25 | — | — | 25 |
| Dispersion | shape after dissolution of A | — | retained | unretained | unretained | unretained |
|  | amount of cake on sieve after dissolution | pts. by wt. (% based on B + C) | 45 (90) | 0 (—) | 0 (0) | 0 (0) |
| Physical properties | tensile strength | kg/cm$^2$ | 551 | 340 | 339 | 354 |
|  | tensile elongation | % | 2.5 | >300 | 7.5 | 5.7 |
|  | shrinkage factor | % | 0.12 | 2.0 | 0.64 | 0.27 |
|  | HDT | °C. | 122 | 35 | 64 | 82 |

TABLE 4

|  |  |  | Example | | Comparative Example | | |
| --- | --- | --- | --- | --- | --- | --- | --- |
|  |  |  | 9 | 10 | 7 | 8 | 3 |
| Composition | (A) PP | pts. by wt. | 75 | 75 | 75 | 75 | 100 |
|  | (B) B-2 (note) | pts. by wt. | 25 | — | 25 | — | — |
|  | B-3 (note) | pts. by wt. | — | 25 | — | 25 | — |
|  | (C) glass fiber | pts. by wt. | 25 | 25 | — | — | 25 |
| Dispersion | shape after dissolution of A | — | retained | retained | unretained | unretained | unretained |
|  | amount of cake on sieve after dissolution | pts. by wt. (% based on B + C) | 36 (72) | 35 (70) | 0 (0) | 0 (0) | 0 (0) |
| Physical properties | tensile strength | kg/cm$^2$ | 583 | 521 | 397 | 367 | 396 |
|  | tensile elongation | % | 2.6 | 2.5 | 7.1 | 7.9 | 5.6 |
|  | shrinkage factor | % | 0.14 | 0.12 | 0.67 | 0.67 | 0.34 |
|  | HDT | °C. | 146 | 129 | 91 | 82 | 102 |

TABLE 5

|  |  |  | Example | Comparative Example | |
| --- | --- | --- | --- | --- | --- |
|  |  |  | 11 | 2 | 9 |
| Composition | (A) PP | pts. by wt. | 75 | 75 | 100 |
|  | (B) B-1 (note) | pts. by wt. | 25 | 25 | — |
|  | (C) glass fiber | pts. by wt. | 25 | — | 25 |
| Dispersion | shape after dissolution of A | — | retained | unretained | unretained |

TABLE 5-continued

| | | | Example | Comparative Example | |
|---|---|---|---|---|---|
| | | | 11 | 2 | 9 |
| | amount of cake on sieve after dissolution | pts. by wt. (% based on B + C) | 43 (86) | 0 (0) | 0 (0) |
| Physical properties | tensile strength | kg/cm² | 370 | 371 | 250 |
| | tensile elongation | % | 3.3 | 7.2 | 3.0 |
| | shrinkage factor | % | 0.45 | 0.67 | 0.89 |
| | HDT | °C. | 97.5 | 88 | 85 |

As is apparent from the foregoing description and examples, the polyolefin resin composition of the present invention and the molded articles thereof are characterized in that the liquid-crystal polyester and the filler material are dispersed throughout the polyolefin base resin in a specific network state. Molded articles made from the compositions of the present invention exhibit excellent mechanical properties and sufficiently enhanced heat deformation temperatures to be suitable for high-temperature end use applications. Furthermore, the compositions can be molded with reduced shrinkage and an enhanced dimensional accuracy to thereby permit the production of large-sized or precision molded articles. The molded articles made form the compositions of the present invention also exhibit excellent surface appearance characteristics. The compositions of the present invention thus permit the production of molded articles which have not been capable of being produced.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A polyolefin molding composition comprising a melt-blend of:
   (A) between 60 to 98 parts by weight of a polyolefin base resin;
   (B) between 2 to 40 parts by weight of a liquid-crystal polyester resin which exhibits optical anisotropic characteristics in the melt-phase and which has a melt viscosity of 10000 to 100 Poise as determined at a temperature of 310° C. and a shear rate of 1200 sec$^{-1}$; and
   (C) between 5 to 200 parts by weight of glass fibers having a means fiber length of at least 50μm; wherein
   the liquid-crystal polyester is dispersed throughout the polyolefin base resin in the form of a three-dimensional network and wherein
   the glass fibers are substantially entirely enveloped by the three-dimensional liquid-crystal polyester network.

2. A molded article consisting essentially of a polyolefin molding composition as in any one of claim 1.

3. A molded article comprised of a polyolefin molding composition which includes a melt-blend of:
   (A) between 60 to 98 parts by weight of a polyolefin base resin;
   (B) between 2 to 40 parts by weight of a liquid-crystal polyester resin which exhibits optical anisotropic characteristics in the melt-phase ad which has a melt viscosity of 10000 to 100 Poise as determined at a temperature of 310° C. and a shear rate of 1200 sec$^{-1}$; and
   (C) between 5 to 200 parts by weight of glass fibers having a mean fiber length of at least 50μm; wherein
   the liquid-crystal polyester is dispersed throughout the polyolefin base resin in the form of a three-dimensional network, and wherein
   the glass fibers are substantially entirely enveloped by the three-dimensional liquid-crystal polyester network.

4. A method of making a polyolefin resin composition comprising forming a homogenous melt-blend of:
   (A) between 60 to 98 parts by weight of a polyolefin base resin;
   (B) between 2 to 40 parts by weight of a liquid-crystal polyester resin which exhibits optical anisotropic characteristics in the melt-phase and which has a melt viscosity of 1000 to 100 Poise as determined at a temperature of 310° C. and a shear rate of 1200 sec$^{-1}$; and
   (C) between 5 to 200 parts by weight of glass fibers having a mean fiber length of at least 50μm and a surface tension of at least 40 dyne; wherein
   the liquid-crystal polyester is dispersed throughout the polyolefin base resin in the form of a three-dimensional network, and wherein
   the glass fibers are substantially entirely enveloped by the three-dimensional liquid-crystal polyester network.

5. A method as in claim 4, wherein melt-blending is accomplished at a temperature of at least 5° to 100° C. greater than the melting point of said polyolefin and liquid-crystal polyester resins.

6. A method as in claim 4, wherein melt-blending is carried out for a time period between 30 seconds to 15 minutes.

* * * * *